United States Patent
Spadafora

(10) Patent No.: US 6,298,941 B1
(45) Date of Patent: Oct. 9, 2001

(54) ELECTRO-HYDRAULIC POWER STEERING SYSTEM

(76) Inventor: William Glenn Spadafora, 5055 Sylvanview, Clarkston, MI (US) 48348

( * ) Notice: Subject to any disclaimer, the term of this patent is extended or adjusted under 35 U.S.C. 154(b) by 0 days.

(21) Appl. No.: 09/492,623

(22) Filed: Jan. 27, 2000

Related U.S. Application Data

(60) Provisional application No. 60/117,890, filed on Jan. 29, 1999.

(51) Int. Cl.$^7$ .............................. B62D 5/04; B62D 5/10; B62D 5/18

(52) U.S. Cl. ............................ 180/422; 180/417; 60/571; 701/41

(58) Field of Search ...................................... 180/417, 421, 180/422, 428, 441, 442, 443, 444, 446; 701/41; 417/44.1, 45, 44.11, 18; 60/571, 572, 573, 494

(56) References Cited

U.S. PATENT DOCUMENTS

| | | |
|---|---|---|
| 3,901,343 | 8/1975 | Inoue . |
| 3,908,779 | 9/1975 | Inoue . |
| 3,939,938 | 2/1976 | Inoue . |
| 4,010,815 | 3/1977 | Strauff . |
| 4,019,616 | 4/1977 | Thorne . |
| 4,410,059 | 10/1983 | Nakayama et al. . |
| 4,872,310 * | 10/1989 | Kaye ...................................... 60/572 |
| 5,080,186 | 1/1992 | Elser et al. . |
| 5,230,396 | 7/1993 | Yasui . |
| 5,313,389 | 5/1994 | Yasui . |

(List continued on next page.)

Primary Examiner—Anne Marie Boehler
(74) Attorney, Agent, or Firm—Reising, Ethington, Barnes, Kisselle, Learman & McCulloch, PC

(57) ABSTRACT

An electro-hydraulic power steering system comprising an elongated vehicle steering linkage rack with a rotatable steering gear in mesh with rack teeth and extending within an elongated power assist cylinder of a rack housing. A rack piston separates the power assist cylinder into first and second power assist working chambers filled with hydraulic fluid. An electric/hydrostatic steering assist module includes a hydraulic actuator cylinder with a linear drive screw extending lengthwise therein and journalled for bi-directional rotation and against axial displacement. An actuator piston is reciprocable but non-rotatable within the actuator cylinder and separates it into first and second hydraulic fluid filled actuating chambers. The drive screw is threadedly engaged with the actuator piston to produce bi-directional linear movement thereof as rotationally bi-directionally driven by a servo motor carried on the module. First and second fluid lines respectively communicate the first and second actuating chambers with the first and second power assist chambers such that the hydraulic fluid filling said actuating chambers is force fed to and from said first and second power assist chambers in response to motion of said actuator piston under control of the motor and drive screw. A fluid cross-over by-pass line connects the first and second fluid lines and contains a solenoid by-pass valve that when opened allows fluid to be merely displaced between the power assist chambers in by-pass relation to said actuator chambers. When the vehicle operator provides a steering input to the rack, the resultant motion of said rack and consequent motion of the rack piston creates a pressure differential in the rack power assist chambers which is sensed by two pressure sensors coupled one in each fluid line to thereby generate a corresponding pressure differential signal. An electronic controller utilizes the pressure differential signal to control the servo motor and thereby cause rotation of the drive screw to move the actuator piston in a proper direction to force sufficient hydraulic fluid from one of the actuator chambers into an associated one of the power assist chambers to thereby minimize the fluid pressure differential existing between said two pressure sensors and thus provide steering assist power in the power cylinder to assist the vehicle operator in manually applying torque via the steering wheel to achieve the desired motion of the rack to thereby move the steerable vehicle wheels.

23 Claims, 3 Drawing Sheets

U.S. PATENT DOCUMENTS

| | | |
|---|---|---|
| 5,373,911 | 12/1994 | Yasui . |
| 5,445,239 | 8/1995 | Miller et al. . |
| 5,558,177 | 9/1996 | Inaguma et al. . |
| 5,655,371 * | 8/1997 | Chuang et al. ................ 60/571 |
| 5,704,250 | 1/1998 | Black . |
| 5,725,023 | 3/1998 | Padula . |

\* cited by examiner

ELECTRO-HYDRAULIC POWER STEERING SYSTEM

This is a regular United States Patent Application filed pursuant to 35 U.S.C. Section 111(a) and claiming the benefit under 35 U.S.C. Section 119(e)(1) of United States Provisional Application Serial No. 60/117,890, filed Jan. 29, 1999 pursuant to 35 U.S.C. Section 111(b)

FIELD OF THE INVENTION

This invention relates generally to power steering systems and more particularly to an electro-hydraulic vehicle power steering system incorporating an electric/hydrostatic steering assist module.

BACKGROUND AND SUMMARY OF THE INVENTION

Typical power assisted steering systems in use today include a belt-driven high rpm rotary hydraulic pump, specifically engineered hoses, tubes, couplings, and an array of brackets and fasteners and a rack and pinion subassembly. All of these components are engineered to endure the rigors of extreme thermal cycling brought about by a combination of ambient temperatures in the engine compartment, and various operational loads handled by the steering pump under the usual driving conditions.

Such power-assisted systems are a source of noise, operating inefficiency, and leakage, and consume a large amount engine power.

Power assisted steering pumps are built to very exact tolerances. Many components of these pumps are fabricated under tightly controlled manufacturing processes in order to maintain design specifications. Small discrepancies in manufacturing processes can lead to many performance problems.

One object of the system of this invention is to limit, if not entirely eliminate, many of the problems associated with present power steering systems.

Another object is to provide a power steering system which is composed of a relatively few simple parts, is rugged and durable in use, and is capable of being inexpensively manufactured and readily installed.

These and/or other objects, features and advantages of the invention will become more apparent as the following description proceeds, especially when considered with the accompanying drawings.

DETAILED DESCRIPTION OF THE PREFERRED EMBODIMENTS

First Embodiment System

Figure 1:
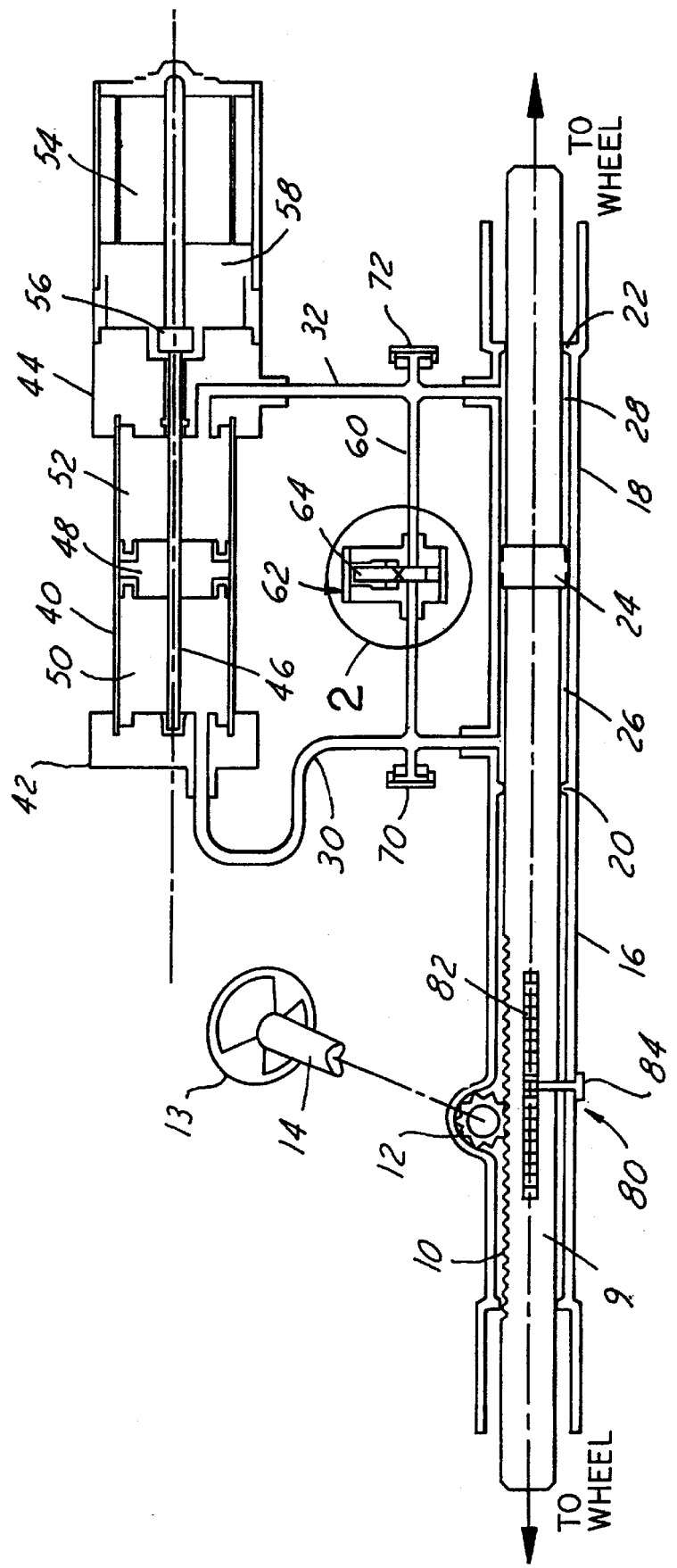
FIG. 1 is a semi-diagrammatic side elevational view of an exemplary first embodiment-electro-hydraulic power assisted steering system constructed in accordance with the invention, showing a solenoid valve closed.

Referring now more particularly to the drawings, FIG. 1 shows, in an exemplary first system embodiment of the invention, an elongated rack 9 adapted to be connected at opposite ends to the steerable wheels (not shown) of a motor vehicle. The rack has a series of teeth 10 along a section of its length. A rotatable pinion 12 in mesh with the rack teeth 10 is connected to a steering wheel 13 of the vehicle by a shaft 14 so as to receive operator steering input.

The rack 9 extends lengthwise within an elongated housing 16 which is constructed to form an elongated power cylinder 18 adjacent one end. Spaced apart circular interior portions 20 and 22 of reduced diameter define the ends of the cylinder and have a sealed engagement with the rack in order to close opposite ends of the cylinder. A piston 24 carried by the rack within the cylinder 18 has a sealed engagement with the interior of the cylinder and separates the cylinder into cylinder chambers 26 and 28 on opposite sides of the piston. Hydraulic fluid fills the chambers 26 and 28. A fluid line 30 communicates with the chamber 26 adjacent one end of the cylinder. A fluid line 32 communicates with the chamber 28 adjacent to the opposite end of the cylinder.

A hydraulic cylinder 40 is sealed at opposite ends by end caps 42 and 44. A linear drive screw 46 extends lengthwise within the cylinder 40 and has its opposite ends rotatably received in the end caps 42 and 44 in a manner which permits the drive screw to be rotated in both directions about its central longitudinal axis, but preventing axial displacement thereof. The drive screw extends through and is threadedly engaged with an actuator piston 48. The actuator piston is reciprocable within the cylinder 40 with its outer periphery in sealed engagement with the inner wall thereof, separating the cylinder into chambers 50 and 52. Rotation of the drive screw 46 produces linear movement of the actuator piston in one direction or the other, depending on the direction of rotation of the drive screw. The drive screw extends through the end cap 44 and is externally connected to a suitable conventional servo motor 54 by a coupling 56. The motor 54 may include a gear box and is carried by a housing 58 mounted on the end cap 44. As an alternative, the end cap 44 may incorporate the motor and gear box.

The mating threads of the drive screw 46 and actuator piston 48 are engineered and fabricated to provide a smooth, low friction operation with minimal leakage between chambers 50 and 52. However, a small controlled leakage of fluid between the drive screw and actuator piston is desirable because the fluid acts as a lubricant between the drive screw and the actuator piston. A subsequently generated boundary layer of fluid aids in limiting back lash typically associated with threaded components. Fluid leakage along the helical path is minimal. It is also predictable and of little consequence to a proportional control system.

The fluid lines 30 and 32 communicate with the hydraulic cylinder 40 through the end caps 42 and 44 leading into the cylinder chambers 50 and 52 on opposite sides of the piston 48. Hydraulic fluid fills the chambers 50 and 52 and is fed to and from the opposite sides of the rack piston 24 within cylinder 18 by motion of the actuator piston 48 under control of the motor 54 and drive screw 46.

A fluid cross-over line 60 connects the fluid lines 30 and 32. A solenoid valve 62 (FIG. 2) is provided in the line 60. The valve 62 has a valve element 64, normally held open by the spring 66, but closed by energization of the solenoid 68. When the valve 62 is open, fluid is merely displaced from one side of the rack piston 24 to the other. Pressure sensors 70 and 72 are provided in the respective lines 30 and 32.

In operation, the vehicle operator provides a steering input to rack 9 by means of pinion 12. Motion of the rack and consequent motion of the piston 24 within cylinder 18 creates a pressure differential in chambers 26 and 28 which is sensed by the pressure sensors 70 and 72. An electronic controller 74 (FIG. 3), which may be controlled by the D.C. power system of the vehicle, receives the pressure signals and provides a control signal to motor 54 so as to command rotation of the drive screw 46 and consequent motion of the actuator piston 48 in a direction to pump hydraulic fluid from one of the chambers 50, 52 of the hydraulic cylinder 40 into one of the chambers 26, 28 of the power cylinder 18 to minimize the pressure differential between the two sensors. This electro-motively developed motion of the actuator piston 48 and consequent hydraulically-developed fluid flow forces provide the power to assist the vehicle operator in manually applying torque via steering wheel 13 to achieve desired motion of the rack 9 to thereby move the steerable vehicle wheels.

When the vehicle is operated at a relatively low speed, it is essential that the power steering system be effective. However, at higher speeds, power assist is not demanded. Under such circumstances a vehicle speed sensor will input a signal to the electronic controller, whereupon the controller will de-energize the solenoid 68, opening the valve 62 and disabling the power assistance. However, in an emergency situation, such as when the operator of the vehicle makes a sudden lane change, a momentary increase in fluid pressure in one of the chambers 26, 28 of the power cylinder 18 would be sensed by one of the sensors 70, 72 sending a signal to the controller to energize the solenoid 68 to close the valve 62 and allow the power assist to return to normal operation.

When initially starting a vehicle, it is desirable for the steering system to know the positions of the rack piston 24 and the actuator piston 48. For example, the rack and wheels may have been turned to one extreme position after the vehicle was shut down. The actuator piston may, at this time, be centered. FIG. 1 illustrates a rack position encoder 80 including an elongated magnetic strip 82 connected to and extending lengthwise of the rack 9 and, a reader, such as a Hall sensor 84, carried by the rack housing 16 for reading the rack position. A similar encoder, or alternatively, a rotary-type encoder 85/87 such as that illustrated in FIG. 4 and described hereinafter, may be provided to read the position of the actuator piston 48. When starting the vehicle, the electronic controller 74 receives a signal from the sensor 84 of the encoder 80 for the rack piston and a signal from the sensor of the encoder for the actuator piston. The results are compared by the controller and if necessary the controller will activate the motor 54 and open valve 62 to rotate the lead screw 46 in the appropriate direction to move the actuator piston 48 into a position corresponding the position of the rack piston 24.

The controller 74 may be powered by tie D.C. power system of the vehicle. The controller preferably consists of a micro-controller in the form of an Application Specific Integrated Circuit (ASIC). The ASIC preferably includes an integrated digital signal processor and appropriate analog-to-digital and digital-to-analog converters.

External inputs to the controller preferably are:
1. Vehicle Ignition Status (On/Off);
2. Pressure Sensor Inputs (Right/Left turn);
3. Rack Position Encoder;
4. Actuator Piston Position Encoder;
5. Vehicle Speed Sensor.

Internal inputs to the controller are preferably in the form of status bits wherein the system would have the ability to monitor its own health. This can be accomplished by comparing known real time output values to expected values found in look-up tables. Examples preferably are:
1. Resistance to impedance measurements on rotor windings;
2. Amperage required to achieve a particular torque value; and
3. Rotor winding temperature.

Digital output from the controller is preferably in the form of:
1. Digital voltage and amperage values for the linear actuator motor 54. The sign of digital voltage value would indicate polarity and thus rotation position.
2. System status bits would be made available to the user by component monitoring purposes.

Digital values received from the controller are preferably converted to useable analog values by way of a analog-to-digital converter. The controller and linear actuator electronics are preferably optically isolated for overall circuit and system protection.

In a startup situation, the ignition is turned on and the controller 74 executes a startup procedure. The controller receives a signal to de-energize the solenoid 68, opening the valve 62, and also receives signals from the sensor 84 of the encoder 80 for the rack piston 24 and from the sensor of the encoder for the actuator piston 48. The results are compared and the controller will then activate the motor 54 to rotate the lead screw 46 as needed to move the actuator piston 48 into alignment with the rack piston 24, so that the positions of the two pistons correspond.

Upon alignment of the two pistons, the controller 74 energizes the solenoid 68 to close the valve 62, so that the power assist is operative. The controller will execute a health status check. If all systems are verified and in proper working order, the controller Will report that the system is ready to receive steering input with power assist. The starting procedure may be completed in only a fraction of a second.

As a fail-safe feature the controller 74 will de-energize the solenoid, allowing spring 66 to open the bypass valve 62 in the event of a system failure, as, for example, a failure of the motor 54, so that the vehicle operator will have complete control over the vehicle, but without power assist.

The actuator cylinder assembly can be manufactured as an individual component as described above for system modulation. Alternatively, similar system arrangement identical in operation, can be built as an integral part of the steering rack housing for system component integration.

Second Embodiment System

Figure 2:
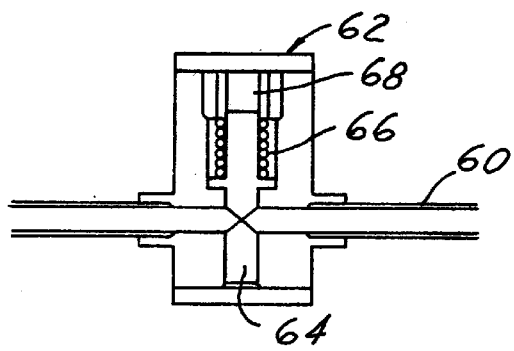
FIG. 2 is an enlargement of the solenoid valve within a circle in FIG. 1, showing the solenoid valve open.
Figure 3:
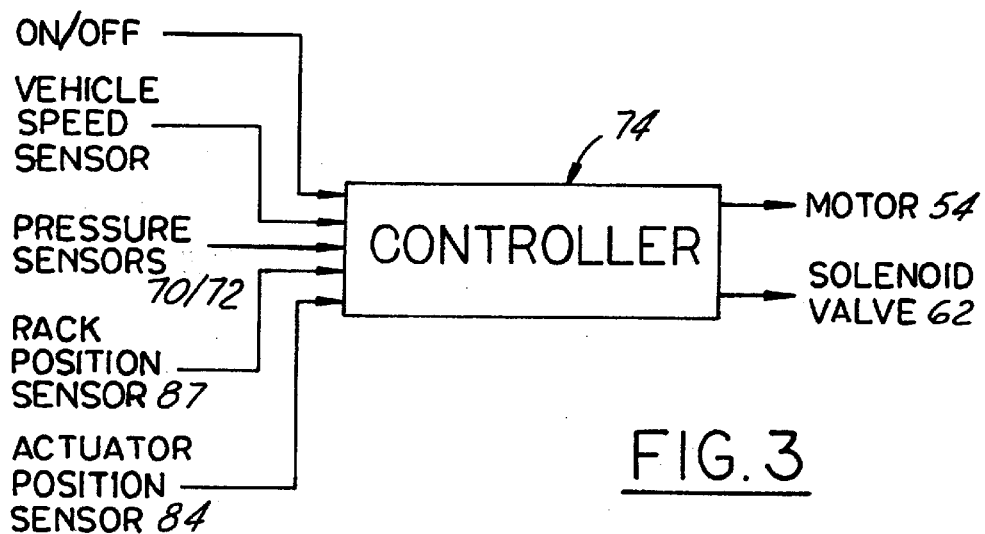
FIG. 3 is a diagrammatic view of a controller for the system embodiment of FIGS. 1 and 2.
Figure 4:
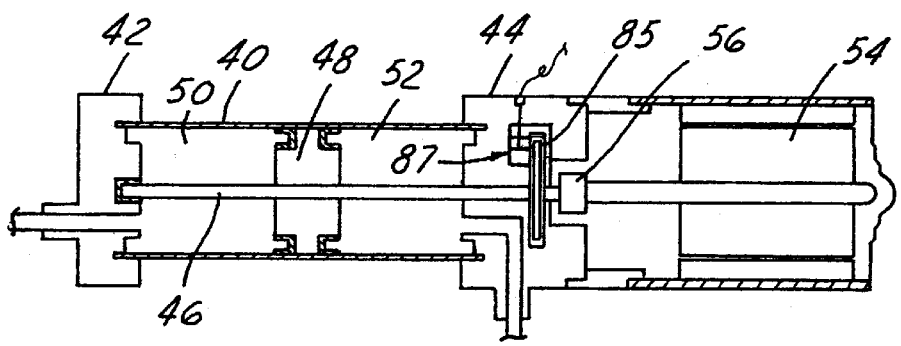
FIG. 4 is a semi-diagrammatic view of the hydraulic cylinder/actuator piston/motor screw drive module of the system of FIG. 1 as modified to incorporate a feed back encoder to serve as an actuator position sensor in an exemplary but preferred second embodiment system illustrated in FIGS. 4, 5 and 6.
Figure 5:
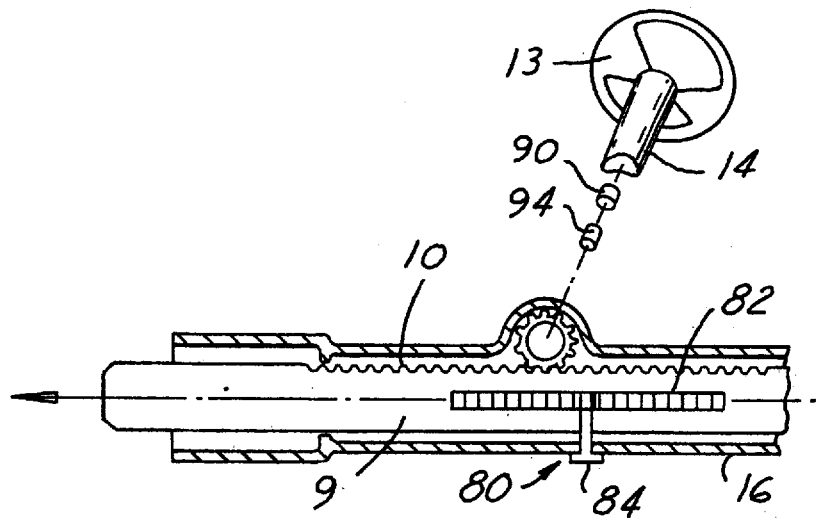
FIG. 5 is a fragmentary duplicate of the left-hand portion of FIG. 1 as modified in the second embodiment system for incorporation of a steering wheel position sensor and a steering wheel torque sensor.
Figure 6:
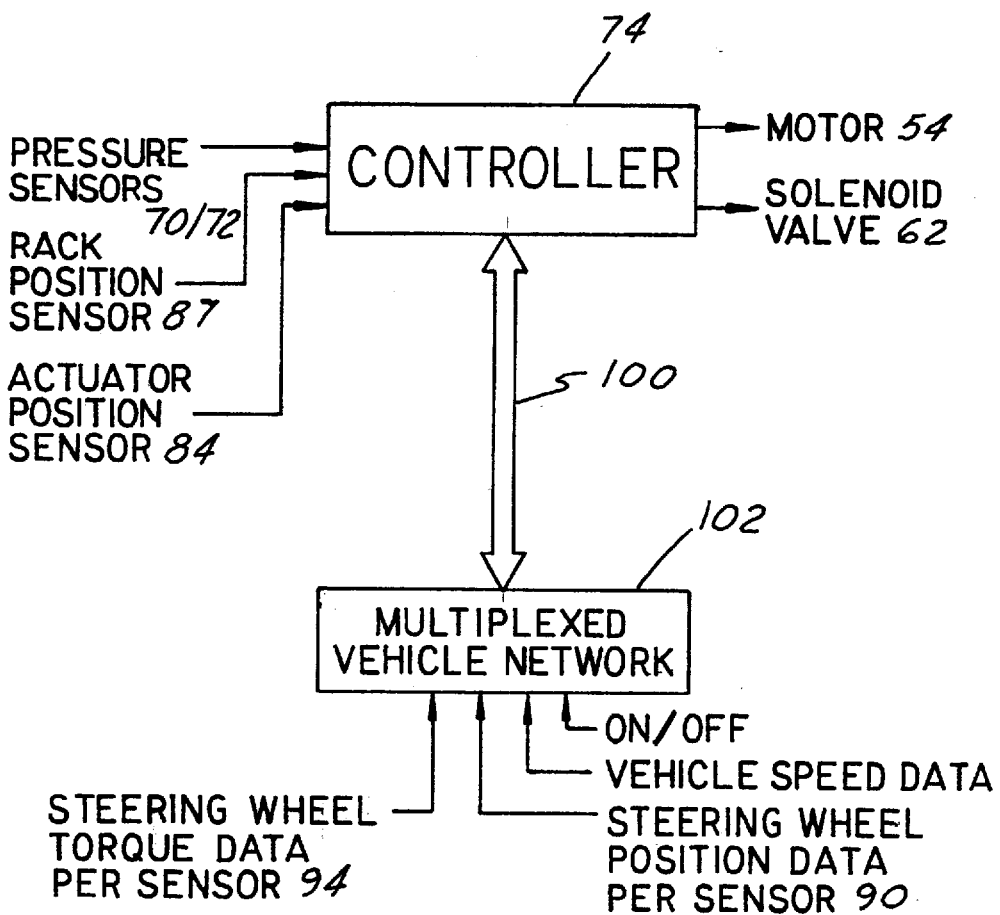
FIG. 6 is a diagrammatic view of the second embodiment of a power assisted steering system of the invention with a controller and associated bi-directionally data coupled multiplexed vehicle network.

FIGS. 4, 5 and 6 illustrate, in conjunction with FIGS. 1 and 2, an exemplary but preferred second embodiment of an electric/hydrostatic steering assist modular system of the invention that retains the basic concept of the first embodiment steering assist module but adds extra capability with additional sensors and electronic communication of data over the multiplexed vehicle network in order to improve the performance, reliability and the ability of the system to adapt to future technology. Those components previously described in conjunction with the first embodiment system of FIGS. 1–3 are given like reference numerals and their description not repeated in referring to the second embodiment system.

The second embodiment system includes the pair of identical fluid pressure transducers 70 and 72 described previously (see FIG. 1) and utilized as described previously in the first embodiment system such that a pressure differential between the opposing hydraulic chambers 26 and 28 indicates quantitatively the input from the steering wheel 13 applied by the vehicle operator to rotate the pinion 12 and gear drive the rack 9 to the right or left to effect vehicle steering. It has also been determined in accordance with the invention that these sensors are also capable of sensing subtle input to the system by road-induced phenomena imparting forces back into the system through the steerable vehicle wheels and associated tie-rod ends.

Likewise the second embodiment system incorporates the absolute position encoder for the rack comprising the magnetic strip 82 and hall sensor 84 (FIG. 5) which again are utilized to determine the real time position of rack 9. This data is used to determine the positional relationship of the rack to that of the steering wheel 13 and the actuator piston 48 in the steering system module 40–56 of FIG. 4 (see also FIG. 1). Again, the real time position of the actual piston 48 is determined by an actuator piston absolute position encoder, which as indicated previously, may be of the type used on the rack, i.e., similar to the magnetic strip 82 and hall sensor 84. Alternatively, FIG. 4 illustrates the incorporation of a conventional feed back encoder subassembly 85–87 made up of an emitter disk 85 affixed to drive screw 46 within end cap 44 for direct rotation with screw 46. A sensor and emitter module 87 is stationarily affixed within end cap 44 and has a suitable gap for permitting direct rotary travel of a peripheral portion of disk 85 therethrough. The construction of emitter disk 85 and sensor and emitter module 87 is conventional and available commercially to provide accurate indicia of the angular displacement occurring between emitter disk 85 and linear displacement of actuator piston 48 in its range of travel in cylinder 40 in response to rotation of drive screw 46. One example of a feed back encoder of this type is disclosed in U.S. Pat. No. 5,704,250 which in turn references U.S. Pat. No. 4,019,616, both of which are incorporated herein by reference and therefore not further described. The second embodiment system incorporates additional sensors as diagrammatically illustrated in FIG. 5, namely a conventional steering column absolute position encoder 90 that senses angular rotation of steering wheel 13 as inputted to steering column 14, and a conventional steering column torque sensor 94.

The steering wheel absolute position encoder 90 provides the following steering wheel information:

a. The angular displacement in degrees (left or right) from the center position. The center position is defined as the point where the steerable wheels are straight ahead.

b. The rate at which the steering wheel is being turned (measured in degrees per second).

The steering wheel position information from sensor 90 is preferably analyzed in the second embodiment system and used for:

a. Initialization and positioning of actuator piston 48 in the steering assist module at the time of vehicle startup.

b. All steering maneuvers.

The steering wheel position information is thus used to calculate the required rpm of the electric motor 54 for steering assist operations.

During vehicle operation a measurable amount of torque is applied to steering column 14, either proactively by the vehicle operator through steering wheel 13 and/or reactively to road forces reflected back through the steering gear of the vehicle into the system. This torque value reflected in steering column 14 is affected by a number of factors including:

a. The coefficient of friction between the vehicle tires and the driving or road surface. This coefficient of friction in turn is affected by:
  1. Vehicle weight,
  2. Vehicle speed, and
  3. Driving surface conditions (i.e., dry pavement, surface temperature, gravel, sand, water, ice).

b. Friction between components of the mechanical steering system:
  1. Articulating joints (i.e., steering column universals, bearings, tie-rod ends, ball joints);
  2. Mating gear surfaces;
  3. Lubrication and contamination seals.

c. Continued application of force to steering wheel after:
  1. Design travel limits of steering system have been met (i.e., fall turn left or right);
  2. Contact with an external obstruction (e.i., curb or a rut in the driving surface).

d. Continued application of steering force to offset external forces;
  1. Constant radius turns (i.e., ramp onto freeway);
  2. Driving surfaces that pitched perpendicular to direction of travel (i.e., a crowned road).

In the second embodiment system the data obtained through torque sensor 94 is used in conjunction with data taken from the original pressure transducers 70 and 72 and integrated to determine and control the magnitude of the torque output of motor 54 to be applied to the develop the hydraulic fluid pressure to assist vehicle steering operations. This data can also be used to differentiate between operator input and road induced phenomena through the suitable software systems of controller 74.

As indicated diagrammatically in the system layout of FIG. 6, the previously described electronic controller 74 can be bi-directionally coupled by an exchange patch connection 100 to a conventional multiplexed vehicle network 102. The signals from pressure sensors 70 and 72 are inputted to controller 74, as are the signals from rack position sensor 87 and actuator piston position sensor 84. The output from controller 74 again is developed to control both motor 54 and solenoid valve 62. However, as seen in FIG. 6, the on/off input signal of the system is applied to the multiplexed vehicle network 102, as is the vehicle speed data, instead of directly to controller 74 as in the first embodiment system per FIG. 3. In addition, the steering torque data from sensor 94 as well as the steering wheel position data from sensor 90 are inputted initially to the multiplexed vehicle network 102. There then is the bi-directional exchange of system data over the multiplexed vehicle network via patch link 100. Thus the multiplexed vehicle network will share with the conventional vehicle on-board ECU the power steering system status, pressure sensitive data, rack position data and actuator sensor data. Accordingly, system performance can be monitored by a suitable software, system diagnostics can be analyzed by a suitable software, and system performance can enhanced by changes in such software.

As indicated hereinbefore, it will be understood that, in both the first and second embodiments of the electric/hydrostatic steering assist system of the invention, the system designer has the option of integrating the power assist module 40–54 with the rack housing 16, such as by piggy-back mounting thereon or encapsulated by suitable re-design of housing 16. When the system components are thus integrated with the rack housing the system can be shipped in a charged state, i.e., filled with steering fluid, so as to eliminate fluid handling processes at the vehicle assembly plant, in contrast to conventional power steering systems that require such costly final assembly fluid charging operations.

On the other hand, either of the first and second system embodiments can be separated into the main sub-assemblies consisting of the power module 40–54, the solenoid valve 62, and the rack and pinion steering gear components 9–28, and 80, 84 of FIG. 1. When modularized into separate sub-assemblies the hydraulic electromotive unit module can be conveniently mounted in a suitable remote locations on the vehicle, and likewise the solenoid valve 62 and associated sensors 70 and 72 can be conveniently located along the fluid coupling lines 30 and 32 as best suits the vehicle application installation. This flexibility of the system of the invention thus reduces the vehicle packaging constraints as compared to that of conventional hydraulic power steering units as well as electric steering technologies currently available.

From the foregoing description it will now be apparent that the electic/hydrostatic steering assist system embodiments of the invention amply fulfill the aforestated objects and provide many features and advantages over the prior art. As will be apparent to those of ordinary skill in the art, the system embodiments provide an alternative replacement for conventional rotary hydraulic pump driven steering technologies. The embodiment components of the system reduce costs by eliminating the high tolerance machine components required in such rotary pump driven systems, reduces the part count required in the components for a power steering system, and reduces potential leak points compared to conventional steering systems. In addition, the system provides an improvement in average fuel economy, provides a more versatile alternative selection to the pure electric steering systems currently available while providing all the functionality of such pure electric steering systems through the computer software in vehicle electronic controller units as well vehicle multiplexed networks. The system of the invention also retains steering system compliance, i.e., the parameter defined as the customary "feel" of the steering system. In addition, the steering assist system is harmlessly disabled via the fail-safe spring loaded spindle valve 64 of the controller valve unit 62.

As indicated previously, the system performance can be monitored via suitable software in the integration with the controller and the multiplexed vehicle network. The system diagnostics can likewise be analyzed via such software, and the performance of the system can be readily enhanced via changes in such software.

The development of hydraulic force for assisting in steering by use of the hydraulic ram type power unit 40, 46, 48, with mechanical force multiplication obtained via the pitch of lead screw 46 as well as the option of a gear reduction unit coupled between the output shaft of motor 54 and lead screw 46, enables high hydraulic pressure development in the hydraulic system while avoiding the noise, vibration and harshness (NVH) factors commonly encountered with conventional steering systems. In such systems equipped with the usual high rpm rotary hydraulic pump, the pressure pulsations developed by the pump output have been a constant problem in terms of undesirable system noise generation and transmission in the hydraulic lines, often with first, second and even third order harmonics of pump output frequency being related and amplified by hydraulic transmission system resonant frequencies. All of these problems are eliminated by the present system.

The system of the invention is also adaptable to a variety of land, sea and air vehicles, and can be applied to both manned vehicles as well as remotely and autonomously controlled vehicles. As indicated in the second embodiment system of FIGS. 4, 5 and 6, the acquired data from the sensors of the steering system can be utilized by other systems on the vehicle via the multiplexed vehicle network 102, e.g., traction control, anti-lock braking, active suspension and collision avoidance vehicle systems.

Motor 54 can be of the type set forth in the aforementioned U.S. Pat. No. 5,704,250, namely an economical conventional frameless motor with permanent magnet rotors to provide a high torque-to-weight inertia ratio with built-in hall effect devices utilized for electronic commutation. Such motors can be of the sequence pulse/rotary stepping servo type so that accurate control over the degree of rotation is produced when the windings are properly pulsed. In this manner, the system is effective to move the fluid from one or the other of the chambers 50 and 52 of the hydraulic cylinder 40 by accurately controlled linear travel of the actuator piston 40 therein. The force by which this fluid is moved is directly proportional to the difference in pressure between chambers 26 and 28 as sensed by the sensors 70 and 72.

Thus, as indicated previously, in low speed or parking conditions, the torque to the system is greatly increased as the pressure differential between chambers 26 and 28 is likewise increased as well. As the vehicle speed increases, the steering load decreases. The load to the system may decrease to the point where power assist is no longer necessary. Under these conditions the solenoid actuated spindle valve 64 is system opened when the speed of the vehicle reaches a point where power assist is no longer required. Fluid can then flow from chamber 26 to chamber 28, and vice versa via line 60 and the by-pass valve 64. Since valve 64 is spring biased toward open position, if the power assist device fails or electrical power is lost to the solenoid, the biasing spring of valve 64 drives spindle 64 to the open condition so that the vehicle operator then can have complete manual control over the vehicle until it can be brought to a safe stop.

In the event of an emergency lane change where a large input to the system is created by the vehicle operator, a momentary pressure increase would be sensed by the pressure transducers 70 and 72, thereby resulting in the closing of the by-pass valve 62 to thereby assist the driver with steering control until the vehicle driving situation is returned to normal.

The system computer software and associated position sensors of rack 9 and actuator piston 48 enable the rack and actuator piston to be adjusted so that the fluid volumes on either side of the actuator piston 48, i.e., in chambers 50 and 52, are proportional to the fluid volumes in rack assist chambers 26 and 28 on the respective sides of the rack piston 24. This enables the linear actuator piston 48 to be properly aligned to correspond with the position of rack 9 in a vehicle start-up situation. Upon such alignment the solenoid actuated by-pass spindle 64 is shifted to its closed position. The control module then executes a health status check. All systems are automatically computer verified to be in proper working order. The control module 74 then reports that the system is ready to receive steering input from the vehicle. This typical start-up procedure is completed in a fraction of a second with suitable conventional computer software control systems applied in accordance with the foregoing parameters of the power steering system of the invention.

What is claimed is:

1. An electro-hydraulic power steering system comprising an elongated rack adapted to be connected at opposite ends to the steerable wheels of a motor vehicle, said rack having a series of teeth along a section of its length, a rotatable pinion in mesh with the rack teeth and adapted to be operably connected to a steering wheel of the vehicle by a shaft so as to receive vehicle operator steering input, said rack extending lengthwise within an elongated housing constructed to form an elongated power cylinder and having thereon spaced apart first and second circular interior portions of reduced diameter defining the axially opposite ends of said power cylinder and having a sealed engagement with the rack in order to close opposite ends of said power cylinder, a piston carried by said rack within said power cylinder having a sealed engagement with the interior of the cylinder and separating the cylinder into first and second power assist working chambers filled with hydraulic fluid, a first fluid line communicating with said first power chamber adjacent one end of said power cylinder, a second fluid line communicating with said second power chamber adjacent to the other, axially opposite end of said power cylinder, a hydraulic actuator cylinder sealed at opposite ends by first and second end caps, a linear drive screw extending lengthwise within said actuator cylinder and having its opposite ends rotatably received in said end caps for rotation in both directions about its central longitudinal axis and secured against axial displacement thereof, an actuator piston reciprocable within said actuator cylinder and separating said actuating cylinder into first and second hydraulic fluid filled actuating chambers, said actuator piston being secured against rotation in said actuating cylinder and said drive screw extending through and being threadedly engaged with said actuator piston such that rotation of said drive screw is operable to produce linear movement of said actuator piston in one direction or the other depending upon the direction of rotation of the drive screw, said drive screw extending through said second end cap and being operably rotationally driven connected to a servo motor carried by said second end cap, said first and second fluid lines respectively communicating with said first and second actuating chambers on opposite sides of said actuator piston such that the hydraulic fluid filling said actuating chambers is fed to and from said first and second power chambers on the opposite sides of said rack piston within said power cylinder by motion of said actuator piston under control of said motor and said drive screw, a fluid cross-over by-pass line connecting said first and second fluid lines, a solenoid valve connected in said cross-over line having a valve element normally held open by a valve spring but closed by energization of the valve solenoid such that when said valve is open fluid is merely displaced from one side of the rack piston to the other and thus between said power chambers in by-pass relation to said actuator chambers, first and second pressure sensors operably coupled respectively in said first and second fluid lines such that when the vehicle operator provides a steering input to said rack by means of said pinion, the resultant motion of said rack and consequent motion of said piston within said power cylinder creates a pressure differential in said rack power chambers which is sensed by said pressure sensors to generate a corresponding pressure differential signal, an electronic controller operably coupled to receive the pressure differential signal from said pressure sensors and operably coupled to provide a corresponding control signal to said bypass valve for controlling the same and to said motor so as to command rotation of said drive screw and consequent motion of said actuator piston in a direction to force hydraulic fluid from a system selected one of said actuator chambers into an associated one of said power cylinder chambers so as to minimize the fluid pressure differential existing between said two sensors, said electromotively developed motion of said actuator piston and consequent hydraulically-developed fluid flow forces thereby providing steering assist power in said power cylinder to assist the vehicle operator in manually applying torque via said steering wheel to achieve the desired motion of said rack to thereby move the steerable vehicle wheel.

2. The system set forth in claim 1 including disabling means operable such that when the vehicle is operated at a relatively low speed the power steering system is effective, but at higher speeds, when power assist is not demanded, power assist is disabled, said disabling means comprising a vehicle speed sensor operable to input a signal to said electronic controller for causing said controller to de-energize said by-pass valve solenoid and open said by-pass valve and thereby disable the power assistance at such higher speeds.

3. The system set forth in claim 2 wherein said disabling means is also operable in an emergency situation, when the operator of the vehicle makes a sudden lane change, thereby manually generating via said pinion and said rack a momentary increase in fluid pressure in one of said power chambers of the power cylinder, such increase being operably sensed by one of said sensors, thereby sending a signal to said controller operable to energize said solenoid to close said by-pass valve and allow the power assist to return to normal operation.

4. The system set forth in claim 1 having position control means operable, when initially starting a vehicle, to determine the operating positions of said rack piston and said actuator piston relative to one another, including a rack position encoder and an associated sensor reader operable for reading the rack position and an actuator piston encoder and associated sensor reader for reading the position of the actuator piston, said encoders and sensors being operably coupled to said electronic controller such that when staring the vehicle said electronic controller receives a position reading signal from each of said encoder/sensors and the results are operably compared by said controller and, if necessary, said controller will control said by-pass valve and will activate said motor to rotate said lead screw in the appropriate direction to move said actuator piston into a position to correctly correspond with the position of said rack piston.

5. The system of claim 4 wherein said controller is adapted to be powered by the d.c. power system of the vehicle, said controller comprising a micro-controller in the form of an application specific integrated circuit that includes an integrated digital signal processor and appropriate analog-to-digital and digital-to-analog converters, and operable to respond for system control to the following external inputs to said controller:

1. vehicle ignition status;
2. pressure sensor inputs;
3. rack position encoder;
4. actuator piston position encoder; and
5. vehicle speed sensor.

6. The system of claim 5 wherein said controller is operable to respond to system internal inputs to the controller in the form of status bits wherein the system is operable to monitor its own health by comparing known real time output values to expected values found in look-up tables, said internal inputs comprising:
   1. resistance to impedance measurements on rotor windings;
   2. amperage required to achieve a particular torque value; and
   3. rotor winding temperature.

7. The system set forth in claim 6 wherein said controller is operable to provide a digital output from the controller in the form of:
   1. digital voltage and amperage values for operating said actuator motor, and wherein the sign of digital voltage value indicates polarity and thus rotation position,
   2. system status bits made available to the user for component monitoring purposes, and
      wherein such digital values received from the controller are converted to useable analog values by said analog-to-digital converter.

8. The system set forth in claim 7 wherein said system controller is programmed to be operable in a vehicle startup situation, such that when the vehicle ignition is turned on, said controller executes a startup procedure to de-energize said bypass valve solenoid, thereby opening said valve, and in response to signals from said position sensor-the results are compared and said controller then activates said motor to rotate said lead screw as needed to move said actuator piston relative to said rack piston such that the positions of said two pistons correspond, and upon alignment of said two pistons, said controller energizes said bypass valve solenoid to thereby close said valve so that power assist of said system is operative, whereupon said controller executes a health status check, and if all systems are verified and in proper working order, said controller is conditioned such that the system is ready to receive steering input with power assist, said starting procedure being completed in only a fraction of a second.

9. The system set forth in claim 8 wherein as a fail-safe feature of said system said controller is operable to de-energize said solenoid and thereby allow said valve biasing spring to open said bypass valve in the event of a system failure so that the vehicle operator will have complete control over the vehicle, but without power assist.

10. The system set forth in claim 1 further including additional sensors, namely a steering column absolute position encoder/sensor that is adapted to sense angular rotation of the vehicle steering wheel as inputted to the vehicle steering column, and a conventional steering column torque encoder/sensor;
    and wherein said steering wheel absolute position encoder/sensor is operable to provide the following steering wheel information:
      a. the angular displacement in degrees left or right from the center position, the center position being defined as the point where the vehicle steerable wheels are oriented straight ahead;
      b. the rate at which the steering wheel is being turned by the vehicle operator measured in degrees per second;
    and wherein said steering wheel position encoder/sensor information is analyzed and used for:
      a. initialization and positioning of said actuator piston in the steering assist module at the time of vehicle start-up; and
      b. all steering maneuvers such that said steering wheel position encoder/sensor information is thus used by operation of said system to calculate the required rpm of said electric motor for steering assists operations.

11. The system set forth in claim 10 wherein the system is programmed and operable such that the data obtained from said torque encoder/sensor is used in conjunction with data from said pressure transducers and integrated to determine and control the magnitude of the torque output of said motor to be applied to said actuator piston to thereby develop the hydraulic fluid pressure to assist vehicle steering operation, and wherein such data is also used to differentiate between vehicle operator input and road induced phenomena by provision of suitable software systems in said controller.

12. The system set forth in claim 11 wherein said system is constructed, arranged and operable such that said electronic controller is bi-directionally coupled by an exchange patch connection to a multiplexed vehicle network, wherein the signals from said pressure sensors, from said rack position encoder/sensor and from said actuator piston position encoder/sensor are initially inputted to said controller, and the output from said controller is operable to control both said motor and said solenoid valve, whereas the on/off input signal of the system, the vehicle speed data, the steering torque data from said torque encoder/sensor as well as the steering wheel position data from said steering column position encoder/sensor are inputted initially to said multiplexed vehicle network and wherein said system is operable to provide bi-directional exchange of system data over said multiplexed vehicle network via a patch link thereof with said controller, and wherein said multiplexed vehicle network is adapted to share with the conventional vehicle on-board ECU the power steering system status, pressure sensor data, rack position data and actuator sensor data, and wherein suitable software is provided in said system such that system performance is monitored, system diagnostics are analyzed and system performance is enhanceable by suitable changes in such software.

13. The system set forth in claim 1 wherein said electric/hydrostatic steering assist system components are constructed and arranged to integrate said power assist actuator cylinder, piston, and motor within a housing for said rack such that the system with integrated components can be shipped as one assembly in a charged state, filled with steering fluid, so as to eliminate fluid handling processes at the vehicle assembly plant.

14. The system set forth in claim 1 wherein the system components are separated into main sub-assemblies consisting of a power actuator piston, cylinder and motor module, a solenoid valve module, and a rack and pinion steering gear and power assist cylinder component module, whereby said power actuator module along with the fluid coupling lines 30 and 32 can be conveniently located remote from said rack and pinion power assist module as best suits the vehicle application installation, such modular flexibility of the system thereby reducing the vehicle packaging constraints.

15. A power steering apparatus comprising a hydraulic actuator having a pair of power assist cylinder chambers and operable to generate assisting power;
    a hydraulic pump for supplying pressurized fluid via supply passageway means to said power assist chambers;

an electric motor for operating said hydraulic pump;

a control valve mechanism operable by a system controller for bypassing between said pair of power assist cylinder chambers of said hydraulic actuator the pressurized fluid supplied by said hydraulic pump through said supply passageway means;

detection means for detecting differential pressure between pressures in said pair of power assist cylinder chambers; and motor control means responsive to the output of said detection means for controlling said electric motor to thereby cause it to drive said pump in accordance with the steering wheel position so as to return the differential pressure to a predetermined first value, said hydraulic pump comprising a double-acting ram actuator piston and cylinder unit having a pair of working chambers separated by said actuator piston and respectively communicating with said pair of power assist cylinder chambers.

16. The apparatus of claim 15 wherein said electric motor is a servo motor and is operable to bi-directionally rotatably drive a lead screw on which said piston is operably threadably received for travel therealong in response to screw rotation.

17. An electro-hydraulic power steering system comprising an elongated rack adapted to be connected at opposite ends to the steerable wheels of a motor vehicle, said rack having a series of teeth along a section of its length, a rotatable steering gear in mesh with the rack teeth and adapted to be operably connected to a steering wheel of the vehicle by a shaft so as to receive vehicle operator steering input, said rack extending lengthwise within an elongated housing constructed to form an elongated power assist cylinder, a piston carried by said rack and separating said power assist cylinder into first and second power assist working chambers filled with hydraulic fluid, a hydraulic actuator cylinder, a linear drive screw extending lengthwise within said actuator cylinder and journalled for bi-directional rotation and against axial displacement, an actuator piston non-rotatably but reciprocably mounted within said actuator cylinder and separating said actuating cylinder into first and second hydraulic fluid filled actuating chambers, said drive screw extending through and being threaddedly engaged with said actuator piston such that bi-directional rotation of said drive screw is operable to produce corresponding bi-directional linear movement of said actuator piston, a servo motor operably coupled to said lead screw for controllably bi-directionally rotating the same, first and second fluid lines respectively communicating said first and second actuating chambers on opposite sides of said actuator piston and communicating respectively with said first and second power assist chambers such that the hydraulic fluid filling said actuating chambers is fed to and from said first and second power chambers on the opposite sides of said rack by linear motion of said actuator piston under control of said servo motor and said drive screw, a fluid cross-over by-pass line connecting said first and second fluid lines, a bypass valve connected in said cross-over line and operable such that when said valve is open fluid is merely displaced between said power chambers in by-pass relation to said actuator chambers, first and second pressure sensors operably coupled respectively in said first and second fluid lines such that when the vehicle operator provides a steering input to said rack the resultant motion of said rack and piston within said power cylinder creates a pressure differential between said rack power chambers which is sensed by said pressure sensors to thereby generate a corresponding pressure differential signal, an electronic controller operably input coupled to receive the pressure differential signal and operably output coupled to provide a corresponding control signal to said bypass valve for controlling the same and to said motor so as to command rotation of said drive screw and consequent motion of said actuator piston in a direction to force sufficient hydraulic fluid from one of said actuator chambers into an associated one of said power cylinder chambers so as to minimize the fluid pressure differential existing between said two sensors, said electro-motivally developed motion of said actuator piston and consequent hydraulically-developed fluid flow forces thereby providing steering assist power in said power cylinder to assist the vehicle operator in manually applying torque via said steering wheel to achieve the desired motion of said rack to thereby move the steerable vehicle wheel.

18. The system set forth in claim 17 including disabling means operable such that when the vehicle is operated at a relatively low speed the power steering system is effective, but at higher speeds, when power assist is not demanded, power assist is disabled, said disabling means comprising a vehicle speed sensor operable to input a signal to said electronic controller for causing said controller to open said by-pass valve and thereby disable the power assistance at such higher speeds.

19. The system set forth in claim 17 wherein said disabling means is also operable in an emergency situation, when the operator of the vehicle makes a sudden lane change, thereby manually generating via said steering gear and said rack a momentary increase in fluid pressure in one of said power chambers of the power cylinder, such increase being operably sensed by one of said sensors, thereby sending a signal to said controller operable to close said by-pass valve and allow the power assist to return to normal operation.

20. The system set forth in claim 17 having position control means operable, when initially starting a vehicle, to determine the operating positions of said rack piston and said actuator piston relative to one another, and being operably coupled to said electronic controller such that when starting the vehicle, if necessary, said controller will control said by-pass valve and will activate said motor to rotate said lead screw in the appropriate direction to move said actuator piston into a position to correctly correspond with the position of said rack piston.

21. The system of claim 20 wherein said controller comprises a micro-controller operable to respond for system control to the following external inputs to said controller:
  1. vehicle ignition status;
  2. pressure sensor inputs;
  3. rack position encoder;
  4. actuator piston position encoder; and
  5. vehicle speed sensor.

22. The system of claim 21 wherein said controller is operable to respond to system internal inputs to the controller in the form of status bits such that the system is operable to monitor its own health by comparing known real time output values to expected values found in look-up tables, said internal inputs comprising one or more of the following:
  1. resistance to impedance measurements on rotor windings;
  2. amperage required to achieve a particular torque value; and
  3. rotor winding temperature.

23. The system set forth in claim 22 wherein said controller is operable to provide a digital output from the controller in the form of digital voltage and amperage values for operating said actuator motor, and wherein the sign of digital voltage value indicates polarity and thus rotation position.

* * * * *

UNITED STATES PATENT AND TRADEMARK OFFICE
CERTIFICATE OF CORRECTION

PATENT NO.    : 6,298,941 B1
DATED         : October 9, 2001
INVENTOR(S)   : William Glenn Spadafora It is certified that error appears in the above-identified patent and that said Letters Patent is hereby corrected as shown below:

<u>Title page,</u>
Item [73], insert to read:

-- Assignee:    DANA CORPORATION
                Toledo, Ohio
                USA --

Signed and Sealed this

Eighteenth Day of June, 2002

Attest:

Attesting Officer

JAMES E. ROGAN
*Director of the United States Patent and Trademark Office*